Dec. 15, 1959 T. F. ZLOTEK 2,917,146
SPRAG AND RETAINER ASSEMBLY FOR ONE-WAY CLUTCHES
Filed Nov. 4, 1957 2 Sheets-Sheet 2
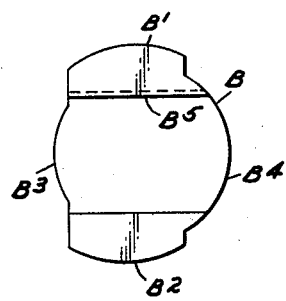
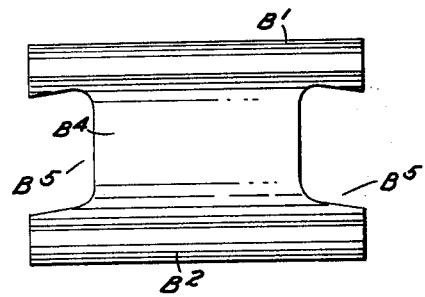
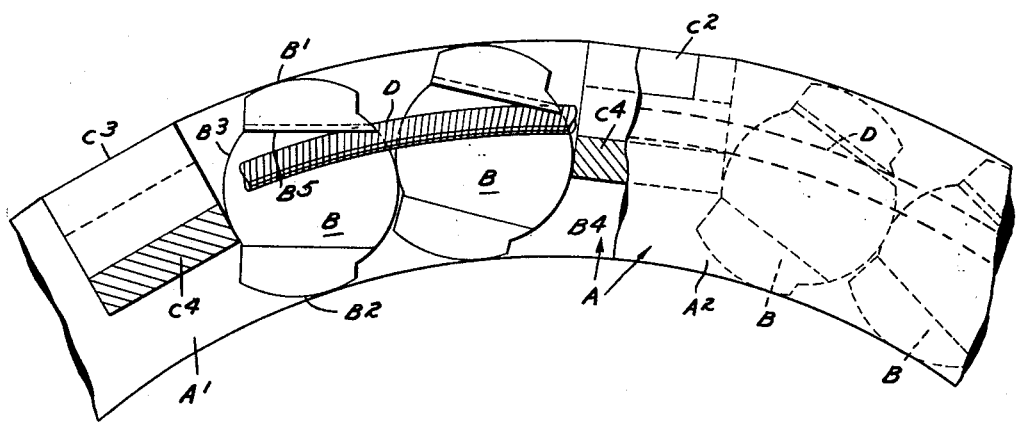
INVENTOR.
THADDEUS F. ZLOTEK
BY
Whittemore Hulbert & Belknap
ATTORNEYS United States Patent Office 2,917,146
Patented Dec. 15, 1959

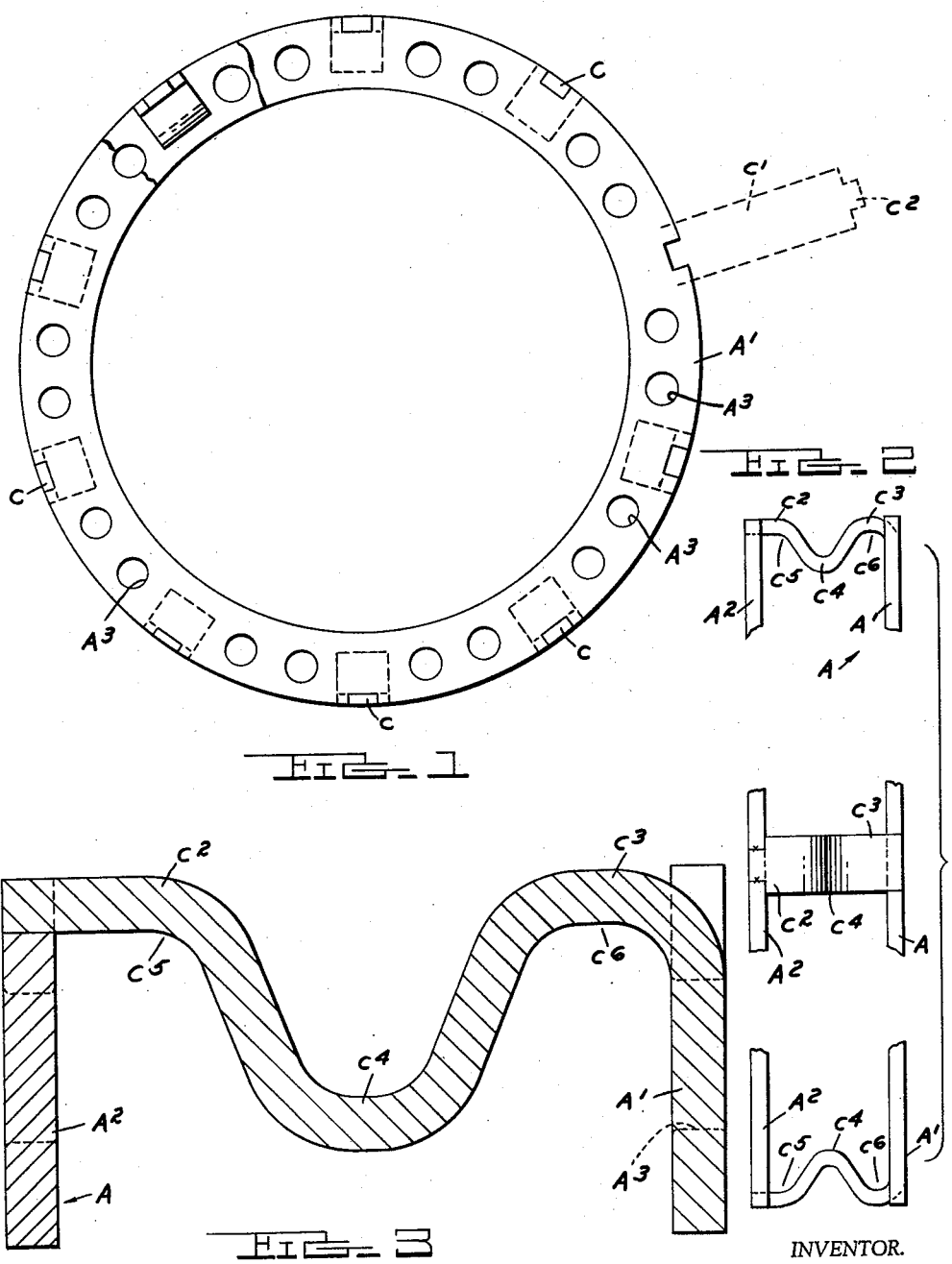

2,917,146

SPRAG AND RETAINER ASSEMBLY FOR ONE-WAY CLUTCHES

Thaddeus F. Zlotek, Detroit, Mich., assignor to Formsprag Company, Van Dyke, Mich., a corporation of Michigan Application November 4, 1957, Serial No. 694,152

5 Claims. (Cl. 192—45.1)

The invention relates to one-way clutches of the sprag type and has reference to both the construction of sprags and the retainer assembled therewith.

The functions of a sprag retainer in a one-way clutch include both the positioning of the sprags in relation to each other and the forming of a unit assembly for transportation which is insertable as such between the raceways of the clutch. However for use in mechanism rotating at high speeds the inertial mass of the retainer may be detrimental and therefore should be reduced where possible. Also the bearing of the retainer against the sprags interferes with their freedom for rolling into and out of clutching engagement.

It is the object of the invention to obtain a construction of sprag retainer, the mass of which is reduced without interferring with its proper functioning. It is a further object to form bearings in the retainer for contact with the sprags which have but slight effect on their freedom for rolling. It is a further object to obtain a construction of sprag best suited for cooperation with each other and the retainer. With these objects in view the invention consists in the construction as hereinafter set forth.

In the accompanying drawings:

Fig. 1 is an elevation partly in section of the retainer viewed in the direction of the axis thereof.

Fig. 2 is a side elevation.

Fig. 3 is an enlarged radial cross section of the retainer through a sprag engaging bearing.

Fig. 4 is a side elevation of the sprag.

Fig. 5 is an end elevation thereof.

Fig. 6 is a fragmentary elevation, partially broken away and sectioned on a plane at 90° to the axis of the sprag and retainer assembly.

To minimize the mass or weight of the retainer I form the same from sheet metal and of the following construction:

A is the retainer including spaced rings $A'$ and $A^2$ arranged at opposite ends of the sprags B and connected to each other by a plurality of cross bars C, all being formed of sheet metal. If desired the cross bars C may be integral with one of the rings, such as $A'$, and in the sheet metal blank first formed extend radially outward, as indicated in dotted lines at $C'$, Fig. 1. They are then bent to extend transversely of the plane of the ring and are connected at their ends to the outer periphery of the second ring $A^2$, as by welding. The cross bars are also fashioned to have portions $C^2$ and $C^3$ extending oppositely inward from the annular ring members $A'$ and $A^2$ substantially perpendicular thereto and also having a radially inwardly extending central portion $C^4$ which forms the bearing for contact with the sprag. The cross bars C may be spaced from each other for the reception therebetween of either a single sprag or a group of sprags. As specifically shown they are spaced for the reception of a pair of sprags. These sprags are preferably formed as shown in Figs. 4 and 5, having the cam portions $B'$ and $B^2$ at opposite ends thereof radially of the retainer and segmental rounded or cylindrical portions $B^3$ and $B^4$ centrally between the cam portions and upon opposite sides of the sprag. These segments have a common center which is offset with respect to the center of the cam portions to position the center of gravity of the sprag as desired. These segments contact with each other in the pair of sprags and also contact with the bearings $C^4$ to position the group. The bearing contacts are centrally between the cam portions of the sprag to have least effect in disturbing its rotation. Between the cross bars the rings $A'$ and $A^2$ may be centrally apertured as at $A^3$ to reduce the mass without diminishing the strength.

For energizing the sprags they are formed with notches $B^5$ at opposite ends thereof for engaging garter springs D. These are also arranged within the channels $C^5$ and $C^6$ of the retainer (Fig. 2), on opposite sides of the central portion $C^4$ and adjacent to the portions $C^2$ and $C^3$. The springs D are preferably biased to expand and thus will force the sprags outward but will themselves be limited in outward movement by the cross bar portions $C^2$ and $C^3$. This forms a unit assembly for transportation which is insertable between the raceways of the clutch.

What I claim as my invention is:

1. A sprag and retainer assembly adapted to be mounted in an annular space between opposing clutch races, comprising a retainer spacing at least some of an annular series of sprags, said sprags having opposed radial race-engaging portions and rounded side bearing segments between said respective radial race-engaging portions, said retainer including annular end members for engaging opposite axial ends of said sprags and circumferentially spaced cross bars having portions adjacent to and extending axially toward one another from corresponding peripheral portions of said respective end members, said cross bars being radially bent between said axially extending portions in the direction toward the respective opposite peripheral portions of said annular end members, against which radial bends said rounded segments of said sprags have bearing engagement, there being annular channels in each cross bar on opposite axial sides of the bend thereof which open radially in the direction of said bends.

2. A sprag and retainer assembly adapted to be mounted in an annular space between opposing clutch races, comprising a retainer spacing at least some of an annular series of sprags, said sprags being formed at their axial ends for spring biasing and having opposed radial race-engaging portions and rounded side bearing segments between said respective radial race-engaging portions, said retainer including annular end members for engaging opposite axial ends of said sprags and circumferentially spaced cross bars having portions adjacent to and extending axially toward one another from corresponding peripheral portions of said respective end members, said cross bars being radially bent between said axially extending portions in the direction toward the respective opposite peripheral portions of said annular end members, against which radial bends said rounded segments of said sprags have bearing engagement, there being annular channels in each cross bar on opposite axial sides of the bend thereof which open radially in the direction of said bends, and annular springs received in said channels in radial biasing engagement with said opposite formed axial sprag ends.

3. A retainer for sprags to hold the latter in circumferentially spaced relation between radially spaced clutch races to be engaged by the sprags comprising annular end members for engaging opposite axial ends of said sprags and circumferentially spaced cross bars having portions adjacent to and extending axially toward one another from correspoding peripheral portions of said respective annular members, said cross bars being radially bent between said axially extending portions in the direction toward the respective opposite peripheral portions of said end members, which radial bends are positioned for bearing engagement by said sprags between opposite radial race-engaging surfaces of the latter, there being annular channels in each cross bar on opposite axial sides of the bend thereof which open radially in the direction of said bend.

4. A sprag and retainer assembly adapted to be mounuted in an annular space between opposing clutch races, comprising a retainer spacing at least some of an annular series of sprags, said sprags having opposed radial race-engaging portions and rounded side bearing segments between said respective radial race-engaging portions, said retainer being a single unit including annular end members extending radially adjacent opposite axial ends of said sprags and circumferentially spaced cross bars extending axially between said respective end members in a position spaced radially between the inner and outer peripheries of said end members, against which cross bars said rounded segments of said sprags have bearing engagement.

5. A sprag and retainer assembly in accordance with claim 4, in which said cross bars extend between corresponding outer peripheral portions of said respective end members and are radially bent between said portions to said position for said bearing engagement with said rounded segments of said sprags.

References Cited in the file of this patent
UNITED STATES PATENTS

| | | |
|---|---|---|
| 2,486,262 | Davis | Oct. 25, 1949 |
| 2,631,706 | Dodge | Mar. 17, 1953 |
| 2,677,449 | Wavak | May 4, 1954 |
| 2,717,677 | Swenson | Sept. 13, 1955 |
| 2,824,636 | Troendly et al. | Feb. 25, 1958 |